United States Patent
Zelakiewicz et al.

(10) Patent No.: US 7,259,377 B2
(45) Date of Patent: Aug. 21, 2007

(54) DIODE DESIGN TO REDUCE THE EFFECTS OF RADIATION DAMAGE

(75) Inventors: Scott Stephen Zelakiewicz, Niskayuna, NY (US); Snezana Bogdanovich, Newark, DE (US); Aaron Judy Couture, Schenectady, NY (US); Douglas Albagli, Clifton Park, NY (US); William Andrew Hennessy, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 61 days.

(21) Appl. No.: 11/300,815

(22) Filed: Dec. 15, 2005

(65) Prior Publication Data

US 2007/0138397 A1  Jun. 21, 2007

(51) Int. Cl.
*G01T 1/24* (2006.01)

(52) U.S. Cl. .................... 250/370.14; 250/370.09; 250/370.11; 257/457; 257/452

(58) Field of Classification Search .......... 250/370.09, 250/370.11, 370.14; 257/452, 457
See application file for complete search history.

(56) References Cited

U.S. PATENT DOCUMENTS

| | | | |
|---|---|---|---|
| 4,999,696 A * | 3/1991 | Gentner et al. ............. 257/458 |
| 5,962,856 A * | 10/1999 | Zhao et al. ............. 250/370.09 |
| 6,617,561 B1 * | 9/2003 | Wei et al. ................ 250/208.1 |
| 2003/0201396 A1 * | 10/2003 | Lee ........................ 250/370.09 |
| 2004/0016869 A1 * | 1/2004 | Campbell et al. ........ 250/208.1 |
| 2006/0131669 A1 * | 6/2006 | Albagli et al. .............. 257/401 |

* cited by examiner

*Primary Examiner*—David Porta
*Assistant Examiner*—Jessica L. Eley
(74) *Attorney, Agent, or Firm*—Fletcher Yoder

(57) ABSTRACT

A photodetector for X-ray applications includes a photodiode at each pixel location that is gated to reduce leakage of charge from the photodiode. A gate layer may be disposed around the entire peripheral edge of the detector, and maintained at a common potential with a contact layer, or at a different potential. A passivation or dielectric layer separates the gate layer from the photodiode. Leakage around the edge of the diode that can result from extended exposure to radiation is reduced by the gate layer.

20 Claims, 4 Drawing Sheets

DIODE DESIGN TO REDUCE THE EFFECTS OF RADIATION DAMAGE

BACKGROUND

The invention relates generally to photodetectors, such as for use in X-ray imaging applications. More particularly, the invention relates to a photodiode design for such detectors that reduces leakage of charge from the photodiode that can result from exposure of the photodetector to radiation over time.

Digital X-ray imaging systems have become increasingly important in a number of technical areas. Such imaging systems are presently used in medical applications, such as for projection X-ray, X-ray tomosynthesis, computer tomography systems, and so forth. Digital X-ray systems are also currently in use for part and parcel inspection, and other such non-medical uses. In general, digital X-ray imaging systems rely upon a stream of X-ray radiation from a source that impacts a detector array after traversing a subject or object of interest. The X-ray radiation is received by a scintillator in the detector, and charges in photodiodes are depleted by photons from the scintillator. The charge depletion can be measured, resulting in information for discrete picture elements ("pixels") at the photodiode locations that can be analyzed for reconstruction of an image.

Flat panel amorphous silicon-based X-ray detectors of the type currently used in digital X-ray systems have excellent performance, but may degrade over time. One mechanism of such degradation involves the amorphous silicon photodiode which can become leaky as a function of X-ray dose. This leakage may be proportional to the area of the photodiode, the length of the periphery of the photodiode, or a combination of the two.

Where flat panel detectors are used for medical applications, dosages are typically prescribed based upon exposure limitations of both patients and medical staff. In other environments, however, such as for industrial part inspection, much stronger X-ray doses may be used. Such stronger doses tend to significantly reduce the life of conventional digital X-ray detectors by significantly increasing the leakage. Similar degradation occurs in medical applications, although over longer periods of time. As the leakage increases, a dark image offset value may be changed to accommodate the leakage, but this ultimately results in reduction of the dynamic range of the individual pixels. That is, the amount of charge between the dark image charge and the fully exposed charge becomes reduced, ultimately resulting in decommissioning of the detectors at the end of an abbreviated useful life.

There is a need, therefore, for an improved digital X-ray detector that can avoid problems with degradation of photodiodes due to exposure. There is a particular need for a photodiode design that can operate in conventional X-ray settings, while reducing or limiting leakage and the consequent degradation of the detector pixels and their performance owing to such leakage.

BRIEF DESCRIPTION

The present invention provides a novel design for a photodiode and detector designed to respond to such needs. The photodiode is configured to receive photons and to generate signals based upon such receipt, such as through a scintillator that receives X-ray radiation. An amorphous silicon photodiode is provided at each pixel location of the detector, in an array with similar photodiodes. The amorphous silicon photodiode is surrounded by a gate layer that limits leakage of charge (i.e., electrons) around edges of the diode. The gate layer may be formed around the entire periphery of the diode, and may form a contact for the diode, such as by contacting an upper surface thereof. The gate layer may be used in conjunction with a separate contact layer, and maintained at either the same potential as the contact layer (e.g., by means of a via connecting the two layers), or at a different potential.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
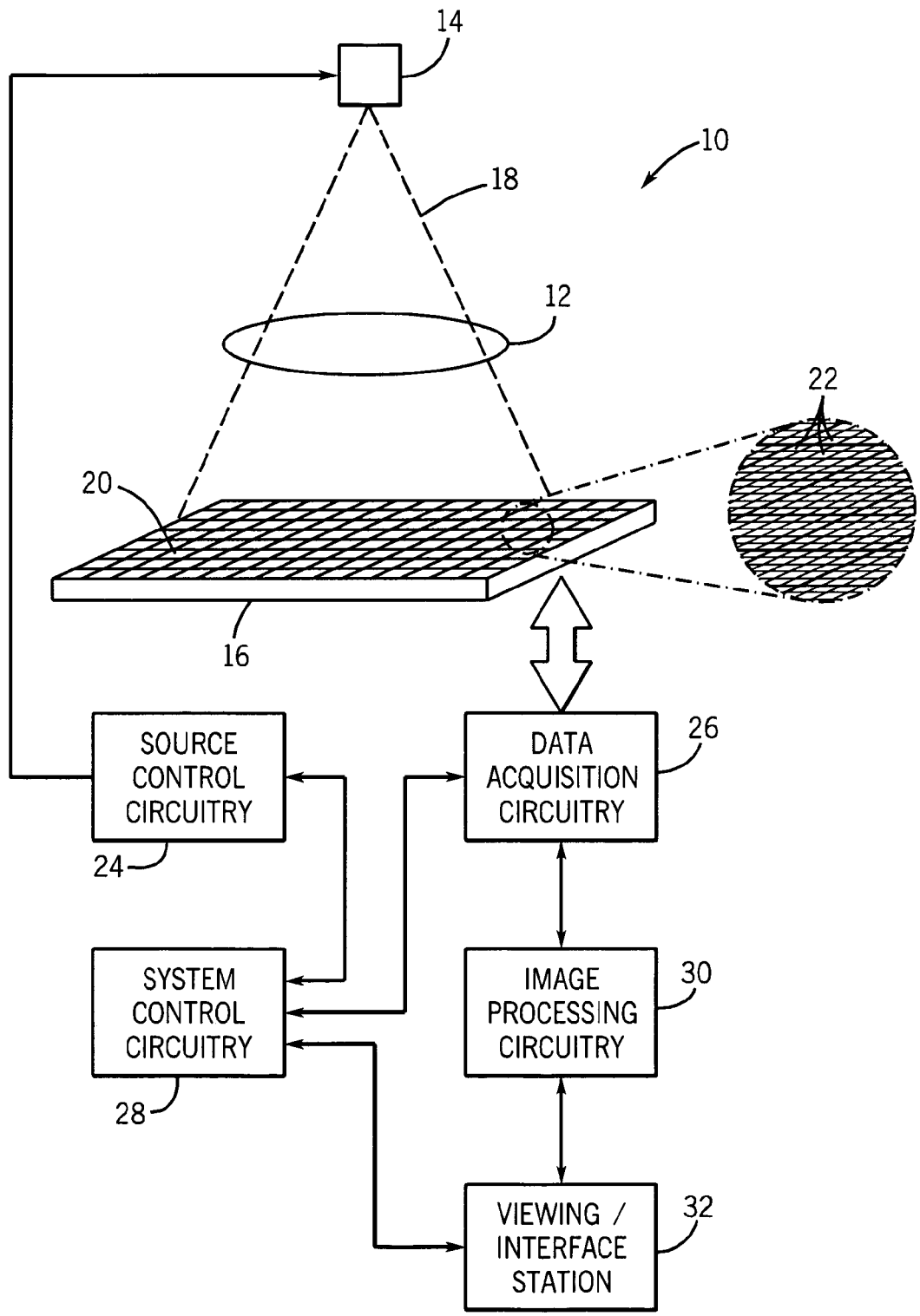
FIG. 1 is a diagrammatical representation of an X-ray imaging system including a digital detector made in accordance with aspects of the present invention.

Turning now to the drawings, and referring first to FIG. 1, an X-ray imaging system 10 is illustrated diagrammatically. The imaging system is designed as a projection X-ray system, although other systems may be employed. For example, the present invention may be used in detectors of projection X-ray systems, tomosythesis systems, computed tomography systems, and so forth.

In the exemplary system illustrated in FIG. 1, a subject 12 is positioned between a source of X-ray radiation 14 and a detector 16. The subject may be any person or object to be examined by exposure to the radiation, such as human or animal subjects in medical applications, parts and the like in industrial applications, parcels, and so forth in still further settings. The source 14 may move or may be stationary. Moreover, various X-ray sources may be employed, including conventional X-ray tubes, as well as other types of X-ray emitters. The X-ray source 14 emits an X-ray beam 18 shown as a fan beam in FIG. 1. Various beam configurations are known in the art and may be employed with the present invention.

The detector 16 is a digital detector of a type generally known and presently in use, but with improved pixel structures as described below. The detector 16 has a surface 20 that is subdivided into an array of discrete picture elements or pixels 22. As will be appreciated by those skilled in the art, at each pixel location 22 a pixel area includes a photodiode and a field effect transistor (FET). These components, in accordance with the present invention, are described in greater detail below. Essentially, however, X-ray radiation impacting the detector contacts a scintillator layer of the detector (described below) that results in lower energy photons impacting each photodiode. Charges at the photodiodes are depleted by the photons, and the photodiodes may be recharged by enabling and changing the conductive state of the respective FET. In this manner, the charge depletion that each photodiode (pixel) location can be read, and the information used to reconstruct an image based upon the relative amount of radiation received at each pixel location.

The system illustrated in FIG. 1 further includes source control circuitry 24 which directs operation of the source 14. Data acquisition circuitry 26 controls enabling, readout, and other functions of the digital detector 16. The source control circuitry 24 and data acquisition circuitry 26 function under the overall control of system control circuitry 28. The system control circuitry typically will enable various imaging routines to be carried out, provide for calibration, and other system functions. Image processing circuitry 30 is provided for reconstruction of user-viewable images based upon the acquired data from the detector 16. Finally, viewing and interface circuitry in a station 32 enables a user or operator to control the overall system functions, view images, and so forth. The particular configuration of the circuits for control and image reconstruction and processing may essentially similar to those existing X-ray imaging systems.

Figure 2:
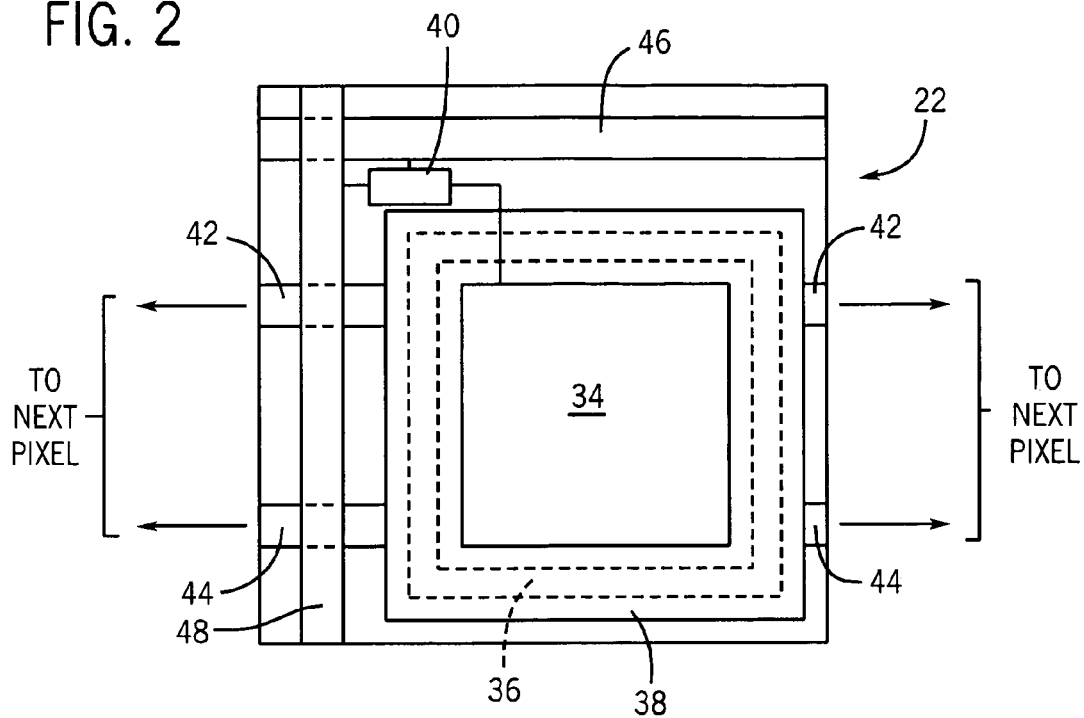
FIG. 2 is a plan view of an exemplary pixel of the detector of FIG. 1, illustrating a first exemplary layout having a gate mechanism for reducing leakage.

FIG. 2 illustrates certain of the functional components that may be located at the individual pixels 22 of the detector shown in FIG. 1. In the embodiment of FIG. 2, each pixel includes a photodiode 34 designed to receive photons resulting from impact of X-ray radiation on the detector. The photodiode 34 is surrounded by a diode gate 36. While gate 36 may partially surround the diode, in the illustrated embodiment the entire periphery of the diode is surrounded by the diode gate. In general, it is presently contemplated that the diode gate may surround at least approximately 25% of the diode periphery, and the structure benefits from even greater gating. A reflector/contact layer 38 is disposed over the diode gate and around the periphery of the photodiode. As discussed in greater detail below, the reflector/contact 38 serves both to reflect photons from around the periphery of the diode back toward the sensing surface of the diode, and makes contact with an upper surface of the diode to serve as a contact.

Each pixel 22 further includes a FET 40. Conductive traces are provided at the pixel location to enable the pixel to be coupled to other pixels in the array, particularly for readout of the charge at the photodiode. In the illustrated embodiment, links 42 and 44 are provided on either side of the photodiode to link the photodiode to those of neighboring pixels. Similarly, conductive traces of 46 and 48 are provided to enable (change the conductive state of) the FET 40, and to readout charge from the pixel via the FET (e.g., by recharging the photodiode and any charge carrying structures of the pixel). In the illustrated embodiment, trace 46 is a scan line for enabling the FET, and trace 48 is a data line for reading out charge at the pixel location. As will be appreciated by those skilled in the art, in practice, data line 48 provides for recharging the photodiode, such that the charge added to the existing charge at the photodiode will be proportional to the charge depletion resulting from an exposure event.

Figure 3:
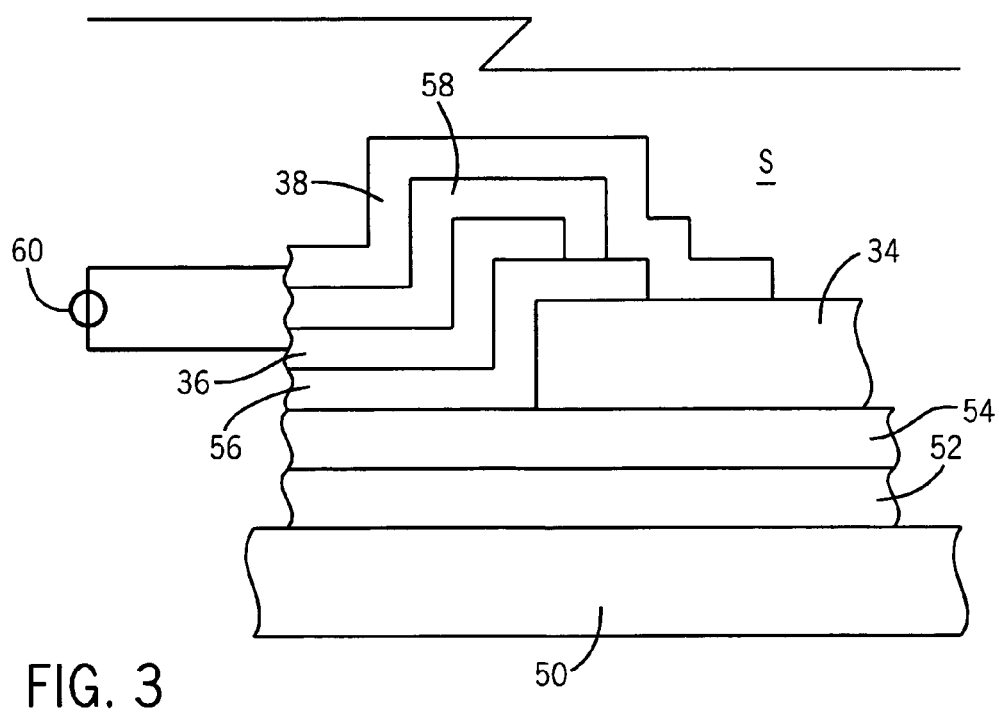
FIG. 3 is a partial sectional view of a portion of the edge of the exemplary photodiode and its surrounding structures of FIG. 2, illustrating exemplary layers of the photodiode and gate structures.

The structure illustrated in FIG. 2 is shown in partial section in FIG. 3. As illustrated in FIG. 3, the pixel, and the entire array of pixels, is covered by a scintillator layer S. The scintillator serves to convert X-ray radiation received by the detector to lower energy photons that can be detected by the photodiode 34. The pixel structure is built upon a substrate layer 50, that may be, for example, a glass. A dielectric layer 52 is disposed on the substrate 50. Exemplary dielectrics may include such materials as nitrides, glasses, and so forth. On the dielectric layer 52, a contact layer 54 is disposed. In general, contact layer 54 will be a metal conductive layer, similar to such layers used on conventional digital detector structures, such as moly, although many other materials may be suitable, such as aluminum, tungsten, titanium, copper, and so forth. The diode 34, itself, is formed on the contact layer 54, with the contact layer 54 serving as one of the contacts for charging and recharging the diode for readout.

The diode gate 36 is a conductive layer surrounding the diode 34 and separated from the diode by a passivation layer 56. The passivation layer 56 may be made, for example, of silicon dioxide, silicon nitride, combinations of these, or of various other suitable materials, including of polymers. The diode gate 36 may be made of a material similar to that of the contact layer 54. The thickness of the passivation layer 56 is controlled such that the gate layer 36 essentially limits the migration of charge (i.e., electrons) down the edge of the photodiode 34 from the reflector/contact layer 38 to the contact layer 54. The reflector/contact layer 38 is, in the embodiment of FIG. 3, separated from the diode gate layer 36 by an additional passivation layer 58, which may be essentially similar to the passivation layer 56. As will be appreciated by those skilled in the art, the passivation layers may be formed by any suitable process, such as chemical vapor deposition. The passivation layers essentially define insulative or dielectric layers in the structure.

In a present embodiment, it has been found that a passivation layer 56 in as range of from 500 Å to 1 μm in thickness appears to be effective at reducing leakage of charge from the photodiode. A thickness of approximately 2500 Å may be preferred. Moreover, the diode gate layer 36 may, as illustrated in FIG. 3, be held at a common voltage with the reflector/contact layer 38, such as by means of a contact via 60. In a present embodiment, for example, the reflector/contact layer 38 is held at a voltage difference of approximately 8 volts with respect with the contact layer 54. Voltage differences across the diode may vary, depending upon the system design, such as from approximately 4 volts to approximately 15 volts. It should be noted, however, that the particular voltages, thicknesses, materials, and so forth described above are provided by way of example only. Other specifications for the components may be used without departing from the scope and the intent of the invention.

Figure 4:
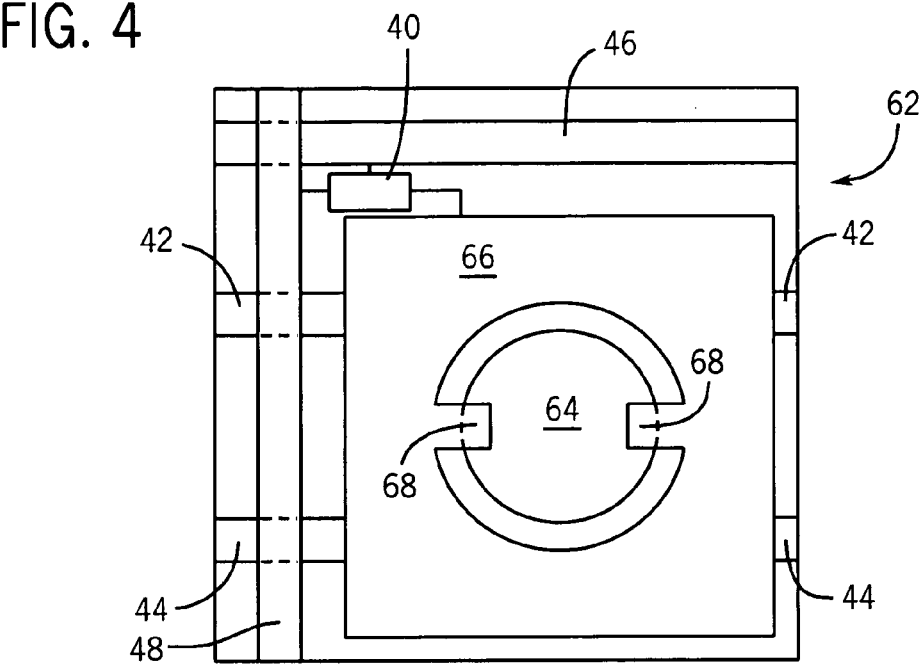
FIG. 4 is a plan view of a further exemplary configuration of a photodiode adapted to reduce leakage by reducing the area and peripheral length of the amorphous silicon photosensitive region, and using a surrounding structure as a reflector/contact.

It has been found that the gate layer 36 facilitates reduction in the leakage from the photodiode, and particularly reduces the degradation of the photodiode performance over time. Because the gate layer is provided around the periphery of the photodiode, leakage at this point is minimized. In accordance with other aspects of present designs, leakage can be further minimized by reducing the surface area of the photodiode, and by modifying the configuration (e.g., shape) of the photodiode periphery. FIG. 4 illustrates an exemplary embodiment of a photodiode incorporating these features.

As shown in FIG. 4, a pixel 62 having a round (circular) photodiode of reduced surface area is illustrated. The photodiode 64 is generally similar in structure to that described above, but is round in periphery. A contact/reflector layer 66 is provided around the photodiode and is joined to the photodiode for readout by contact tabs 68. It has been found that the use of contact tabs 68 can reduce the effective surface area of the photodiode covered by the contact/reflector layer 66, thereby reducing the intrusion of the contact/reflector layer into the sensitive region of the photodiode. Other aspects of the pixel structure are generally similar to that described above with reference to FIG. 2.

Figure 5:
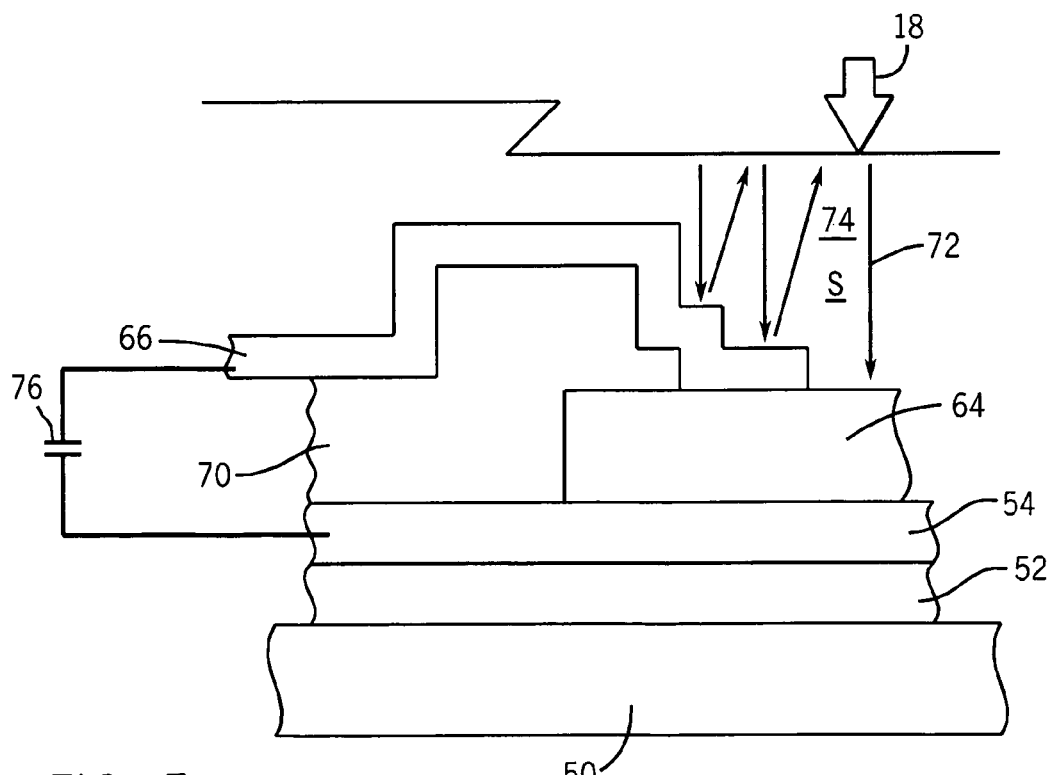
FIG. 5 is a partial sectional view of a portion of the structure shown in FIG. 4, illustrating various layers in the exemplary implementation.

As shown in FIG. 5, the structure of FIG. 4 includes the substrate 50 on which the dielectric layer 52 and contact layer 54 are disposed. A passivation or dielectric layer 70 is provided between the contact/reflector 66 and the contact layer 54.

The contact/reflector layer 66 reflects photons that may impact this layer to add to the sensitivity and data collection capabilities of the overall structure. That is, incident radiation 18 contacting the scintillator S will include either photons that enter directly into the round sensitive region of the photodiode, as indicated by reference numeral 72, or reflected photons 74. These reflected photons may be reflected by any portion of the contact/reflector 66, and will rebound within the scintillator material until they ultimately contact the sensitive area of the photodiode 64. In presently contemplated embodiments, the reduced surface area photodiode 64 occupies from 20 to 60 percent of the area of the pixel. The contact/reflector layer 66, then, increases the effective fill factor of the pixel covered by the photodiode and contact/reflector layer 66, combined, to greater than 60% in the presently contemplated embodiments. It should also be noted that other configurations for the photodiode may also be envisaged, such as oval shapes, and so forth. However, the circular shape illustrated minimizes the perimeter at which leakage can occur.

Figure 6:
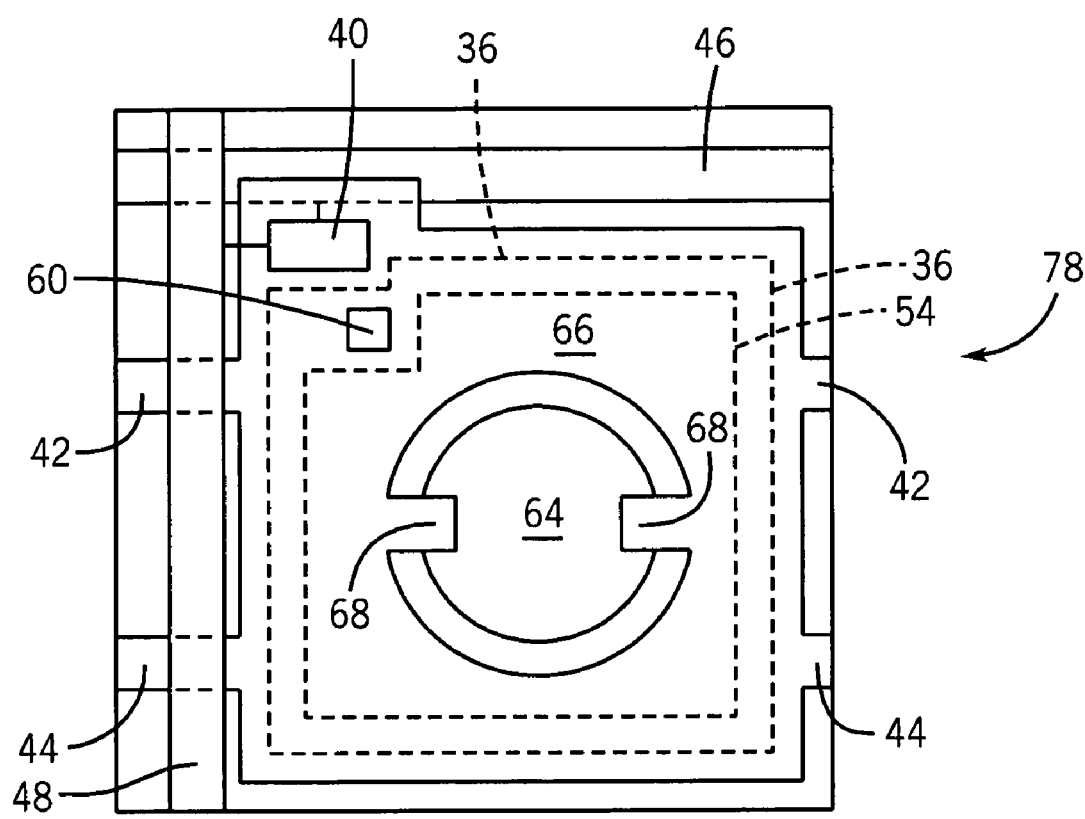
FIG. 6 is a plan view of a further alternative implementation of the photodiode at a pixel location that utilizes a diode gate in conjunction with a reflector/contact.

Moreover, in the embodiment illustrated in FIG. 5, the contact/reflector layer 66 serves to increase the overall capacitance of the photodiode, and more generally of the pixel location. For example, as illustrated in FIG. 6, the contact/reflector layer 66 is separated from the contact layer 54 by a passivation layer that can be made relatively thin so as to act as a dielectric for an effective capacitor 76 defined by these layers. It has been found that the use of such an inherent capacitor for storing charge at the pixel location can increase the effective pixel capacitance to in excess of 60% of the capacitance provided by a large photodiode (i.e., a conventional structure).

The foregoing improvements to the pixel and detector design may be incorporated together in the detector. FIG. 6 illustrates such a combined and improved pixel structure. As shown in FIG. 6, the contact/reflector 66 may, itself, serve to limit leakage from the periphery of the photodiode. That is, when the contact/reflector 66 is positioned in close proximity to the photodiode peripheral edge, and separated by one or more passivation layers, the contact/reflector layer 66 may itself act as a gate limiting leakage of charge around the diode edges.

FIG. 6, then, illustrates the aforementioned improvements combined in a reduced area, gated diode pixel 78 with enhanced capacitance. As noted above FIG. 6, the reduced area photodiode 64 again has a circular shape to reduce both its surface area and the length of its peripheral edge. The contact/reflector layer 66 overlies the region surrounding the photodiode 64 and makes contact with the photodiode by means of contact tabs 68. Below the contact/reflector layer 66, a diode gate 36 is provided. The diode gate 36 is electrically coupled to the contact/reflector layer 66 by a conductive via 60 as described above. Further, below the diode gate 36, the contact layer 54 extends and is separated from the diode gate 36 to form a capacitor to increase the effective capacitance of the photodiode. Other structures, including the FET 40, the conductive traces 42 and 44, and the scan and data lines 46 and 48 are essentially similar to those described above.

The improved pixel structure of FIG. 6, then, effectively reduces leakage and therefore degradation at the pixel location by reducing the surface area of the photodiode, reducing the length of the peripheral edge of the photodiode, and gating the edge to reduce leakage of electrons along the edge, while still maintaining an elevated sensitivity by virtue of the reflectivity of the contact/reflector layer 66. The structure also increases the effective capacitance at the pixel location by defining a capacitor between the conductive layers by means of the intermediate passivation or dielectric layer.

It should be noted that, while the reduced surface area diode described above has a generally round shape, other shapes may, of course benefit from advantages of the designs and techniques described here. For example, rounded or even multi-sided (e.g., square) diodes may be formed that still employ the gating, or reflector or capacitor concepts described above, together or in combination. Similarly, while a presently contemplated embodiment has a fill factor of approximately 60% of the surface area of the pixel, other fill factors may be used. Moreover, the reflector may occupy more surface area than the diode itself, and the pixel still provide good sensitivity.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A photodetector formed of an array of pixels on a substrate and covered by a scintillator, each pixel comprising:
   a photodiode configured to receive photons and to deplete a stored charge in response to the received photons; and
   a gate layer surrounding at least a portion of an edge of the photodiode, the gate layer limiting charge leakage between contacts of the photodiode.

2. The photodetector of claim 1, wherein at each pixel the gate layer is electrically coupled to a contact of the photodiode and maintained at a common voltage with the contact.

3. The photodetector of claim 1, wherein at each pixel the diode is formed in an underlying contact layer, and the gate layer is separated from the underlying contact layer by a passivation layer.

4. The photodetector of claim 1, wherein at each pixel the gate layer is a contact of the photodiode.

5. The photodetector of claim 1, wherein at each pixel the photodiode includes an upper contact layer, and the gate layer is coupled to the upper contact layer by a via.

6. The photodetector of claim 1, wherein at each pixel the gate layer is maintained at a voltage different from a voltage level of two contacts of the photodiode.

7. The photodetector of claim 1, wherein each photodiode has a substantially round periphery.

8. The photodetector of claim 1, wherein each photodiode occupies a surface area of from approximately 20% to approximately 60% of a total surface area of the respective pixel.

9. A photodetector formed of an array of pixels on a substrate and covered by a scintillator, each pixel comprising:
   a photodiode configured to receive photons and to deplete a stored charge in response to the received photons;

a lower contact layer underlying the photodiode and in contact with a lower surface thereof;

an upper contact layer in contact with an upper surface of the photodiode;

a gate layer surrounding at least a portion of an edge of the photodiode, the gate layer limiting charge leakage between the upper and lower contact layers; and a passivation layer separating the gate layer and the lower contact layer.

10. The photodetector of claim 9, wherein at each pixel the gate layer is separated from the upper contact layer by an additional passivation layer.

11. The photodetector of claim 9, wherein at each pixel the gate layer is electrically coupled to the upper contact layer by a via.

12. The photodetector of claim 9, wherein at each pixel the gate layer is maintained at a voltage different from a voltage level of the upper and lower contact layers.

13. The photodetector of claim 9, wherein each photodiode has a substantially round periphery.

14. The photodetector of claim 9, wherein each photodiode occupies a surface area of from approximately 20% to approximately 60% of a total surface area of the respective pixel.

15. A photodetector formed of an array of pixels on a substrate and covered by a scintillator, each pixel comprising:

a substantially round photodiode configured to receive photons and to deplete a stored charge in response to the received photons, the photodiode occupying a surface area of from approximately 20% to approximately 60% of a total surface area of the respective pixel;

a lower contact layer underlying the photodiode and in contact with a lower surface thereof;

an upper contact layer in contact with an upper surface of the photodiode;

a gate layer surrounding at least a portion of an edge of the photodiode, the gate layer limiting charge leakage between the upper and lower contact layers; and a passivation layer separating the gate layer and the lower contact layer.

16. The photodetector of claim 15, wherein at each pixel the gate layer is separated from the upper contact layer by an additional passivation layer.

17. The photodetector of claim 15, wherein at each pixel the gate layer is electrically coupled to the upper contact layer by a via.

18. The photodetector of claim 15, wherein at each pixel the gate layer is maintained at a voltage different from a voltage level of the upper and lower contact layers.

19. The photodiode of claim 15, wherein the upper contact layer and the photodiode occupy a combined surface area greater than approximately 60% of a total surface area of each pixel.

20. The photodiode of claim 15, wherein the upper contact layer and the gate layer form, with the lower contact layer, a capacitor for storing charge depleted by receipt of photons by the photodiode.

* * * * *